United States Patent
Morse et al.

(10) Patent No.: US 6,282,480 B1
(45) Date of Patent: Aug. 28, 2001

(54) ELECTRONIC BRAKE CONTROLLER AND DISPLAY

(76) Inventors: Dennis M. Morse, 139 Avondale, Jackson, MI (US) 49023; Bruce E. Smith, 14517 Halter Rd., Leo, IN (US) 46765; Larry Eccleston, 18565 G Dr. North, Marshall, MI (US) 49068

(*) Notice: Subject to any disclaimer, the term of this patent is extended or adjusted under 35 U.S.C. 154(b) by 0 days.

(21) Appl. No.: 09/430,111

(22) Filed: Oct. 29, 1999

(51) Int. Cl.[7] .................................................. G06F 7/70
(52) U.S. Cl. ........................... 701/70; 340/461; 340/479; 303/124; 303/181
(58) Field of Search ................................. 701/70, 29, 31, 701/1; 303/7, 122.04, 20, 124, 181; 340/438, 439, 461, 462, 478, 479

(56) References Cited

U.S. PATENT DOCUMENTS

| | | | |
|---|---|---|---|
| 2,228,631 | 1/1941 | Kuiper | 303/3 |
| 3,519,805 | 7/1970 | Throne-Booth | 701/70 |
| 3,601,794 | 8/1971 | Blomenkamp et al. | 340/464 |
| 3,738,710 | 6/1973 | Pokrinchak et al. | 303/20 |
| 3,780,832 | 12/1973 | Marshall | 188/3 R |
| 3,897,979 | 8/1975 | Vangalis et al. | 303/24.1 |
| 3,908,782 | 9/1975 | Lang et al. | 188/122 A |
| 3,909,075 | 9/1975 | Pittet, Jr. et al. | 303/24.1 |
| 3,953,084 | 4/1976 | Pittet, Jr. et al. | 303/24.1 |
| 3,955,652 | 5/1976 | Nilsson et al. | 188/122 R |
| 3,967,863 | 7/1976 | Tomecek et al. | 303/24.1 |
| 3,981,542 | 9/1976 | Abrams et al. | 303/20 |
| 3,981,544 | 9/1976 | Tomecek et al. | 303/122.05 |
| 4,030,756 | 6/1977 | Eden | 303/9.68 |
| 4,042,810 | 8/1977 | Mosher | 701/19 |
| 4,043,608 | 8/1977 | Bourg et al. | 303/167 |
| 4,050,550 | 9/1977 | Grossner et al. | 188/122 R |
| 4,084,859 | 4/1978 | Bull et al. | 303/123 |
| 4,122,434 | 10/1978 | Jensen | 340/453 |
| 4,161,649 * | 7/1979 | Klos et al. | 303/7 |
| 4,277,895 | 7/1981 | Wiklund | 33/366.14 |
| 4,295,687 | 10/1981 | Becker et al. | 303/20 |
| 4,386,427 | 5/1983 | Hosaka | 714/10 |
| 4,398,252 | 8/1983 | Frait | 701/70 |
| 4,402,047 | 8/1983 | Newton et al. | 701/70 |
| 4,550,372 | 10/1985 | Kahrs | 303/152 |
| 4,587,655 | 5/1986 | Hirao et al. | 714/15 |
| 4,660,418 | 4/1987 | Greenwood et al. | 16/225 |
| 4,721,344 | 1/1988 | Frait et al. | 303/20 |
| 4,722,576 | 2/1988 | Matsuda | 303/122.05 |
| 4,726,627 | 2/1988 | Frait et al. | 303/24.1 |
| 4,836,616 | 6/1989 | Roper et al. | 303/122.06 |
| 4,849,655 | 7/1989 | Bennett | 303/24.1 |
| 4,850,656 | 7/1989 | Ise et al. | 303/192 |
| 4,856,850 | 8/1989 | Aichele et al. | 303/20 |
| 4,928,084 * | 5/1990 | Reiser | 340/479 |
| 5,032,821 | 7/1991 | Domanico et al. | 340/440 |
| 5,044,697 | 9/1991 | Longyear et al. | 303/14 |
| 5,050,937 | 9/1991 | Eccleston | 303/7 |
| 5,050,940 | 9/1991 | Bedford et al. | 303/166 |
| 5,058,960 | 10/1991 | Eccleston et al. | 303/24.1 |
| 5,139,315 | 8/1992 | Walenty et al. | 303/162 |
| 5,149,176 | 9/1992 | Eccleston | 303/20 |

(List continued on next page.)

Primary Examiner—Jacques H. Louis-Jacques
(74) Attorney, Agent, or Firm—Price, Heneveld, Cooper, DeWitt & Litton

(57) ABSTRACT

A brake control unit provides a properly oriented brake control display irrespective of whether the brake control unit is installed in a normal or inverted mode. The brake control unit determines whether a brake control signal is asserted when the brake control unit is connected to a vehicle power supply. If so, the brake control display is inverted. Alternatively, the brake control unit determines orientation by monitoring a position sensitive device. The brake control unit is also capable of determining and displaying the status of a brake load on the brake control display. In addition, the brake control unit is capable of determining and displaying an output voltage of the brake control unit on the brake control display.

22 Claims, 4 Drawing Sheets

U.S. PATENT DOCUMENTS

| | | | |
|---|---|---|---|
| 5,255,962 | 10/1993 | Neuhaus et al. | 303/188 |
| 5,333,948 | 8/1994 | Austin et al. | 303/24.1 |
| 5,352,028 | 10/1994 | Eccleston | 303/20 |
| 5,606,308 | 2/1997 | Pinkowski | 340/458 |
| 5,615,930 | 4/1997 | McGrath et al. | 303/7 |
| 5,620,236 | 4/1997 | McGrath et al. | 303/7 |
| 5,648,755 * | 7/1997 | Yagihashi | 340/439 |
| 5,649,749 * | 7/1997 | Kullmann et al. | 303/122.04 |
| 5,741,048 | 4/1998 | Eccleston | 303/7 |
| 5,785,393 | 7/1998 | McGrath et al. | 303/7 |
| 5,800,025 * | 9/1998 | McGrath et al. | 303/7 |
| 5,949,147 | 9/1999 | McGrath et al. | 307/10.1 |
| 6,012,780 | 1/2000 | Duvernay | 303/7 |
| 6,039,410 | 3/2000 | Robertson et al. | 303/7 |
| 6,068,352 | 5/2000 | Kulkarni et al. | 303/20 |
| 6,100,943 * | 8/2000 | Koide et al. | 349/11 |

* cited by examiner

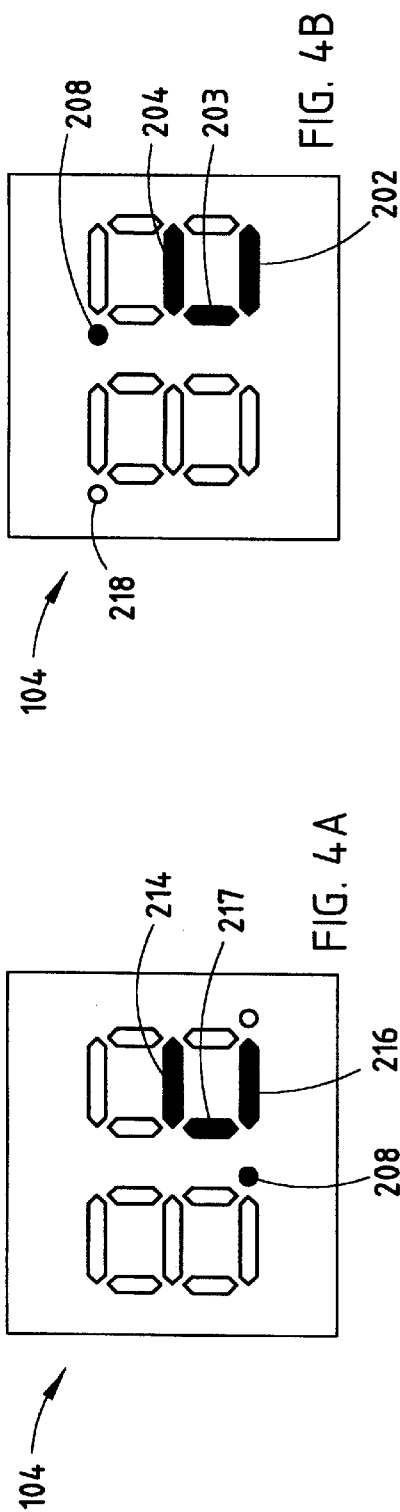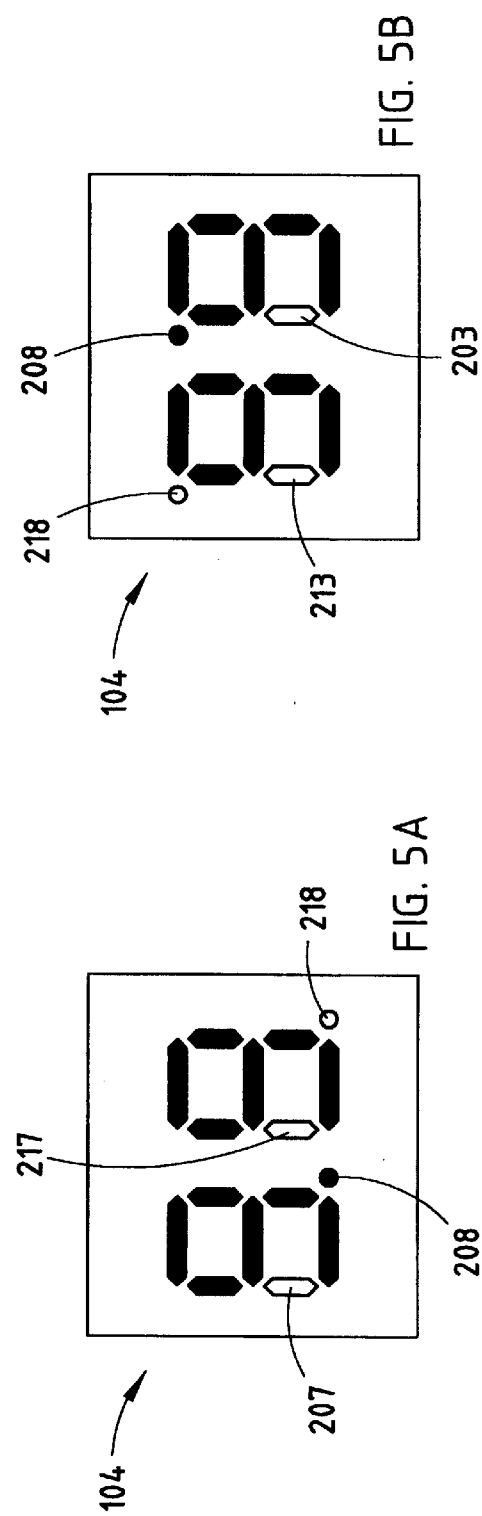

ELECTRONIC BRAKE CONTROLLER AND DISPLAY

BACKGROUND OF THE INVENTION

The present invention is directed to a brake control unit, and more specifically to a brake control display.

Various prior art brake control units have provided a display to a user of the brake control unit. These displays have included a plurality of light emitting diodes (LEDs) and/or seven segment displays. The LED-type display has provided an indication of the magnitude of the output of the brake control unit. The seven segment display has provided a numerical value for the output of the brake control unit. However, the prior art brake control units, with numerical-type displays, have only provided a readable display if installed in a normal mode. Additionally, no prior art brake control unit has provided a alphanumeric indication of whether a load (brake electromagnet) was coupled to the brake control unit.

SUMMARY OF THE INVENTION

An embodiment of the present invention is directed toward a technique for providing a properly oriented brake control display irrespective of whether a brake control unit is installed in a normal or inverted mode. In one embodiment, the brake control unit determines whether a brake control signal is asserted when the brake control unit is connected to a vehicle power supply. In another embodiment, a position sensitive device is utilized to determine the orientation of the brake control unit. If the brake control unit is installed in the inverted mode, the brake control display is inverted. Another embodiment of the present invention is directed toward determining and displaying a status of a brake load on the brake control display. Yet another embodiment of the present invention is directed toward determining and displaying an output voltage of the brake control unit on the brake control display.

These and other features, advantages and objects of the present invention will be further understood and appreciated by those skilled in the art by reference to the following specification, claims, and appended drawings.

BRIEF DESCRIPTION OF THE DRAWINGS

FIGS. 4A–B are front views of a brake control display when a brake control unit is powered up and a load is detected, according to an embodiment of the present invention;

FIGS. 5A–B are front views of a brake control display indicating an output voltage of a brake control unit, according to an embodiment of the present invention.

DETAILED DESCRIPTION OF PREFERRED EMBODIMENT

The present invention is directed to a technique for providing a properly oriented brake control display irrespective of whether a brake control unit is installed in a normal or inverted mode. The brake control display includes a plurality of indicators (LEDs) and a plurality of seven segment displays. In the preferred embodiment, the brake control display includes two LEDs and two seven segment displays. According to another embodiment, the brake control unit is capable of determining and displaying a status of a brake load on the brake control display. In yet another embodiment, the brake control unit determines and displays an output voltage of the brake control unit on the brake control display.

Figure 1:
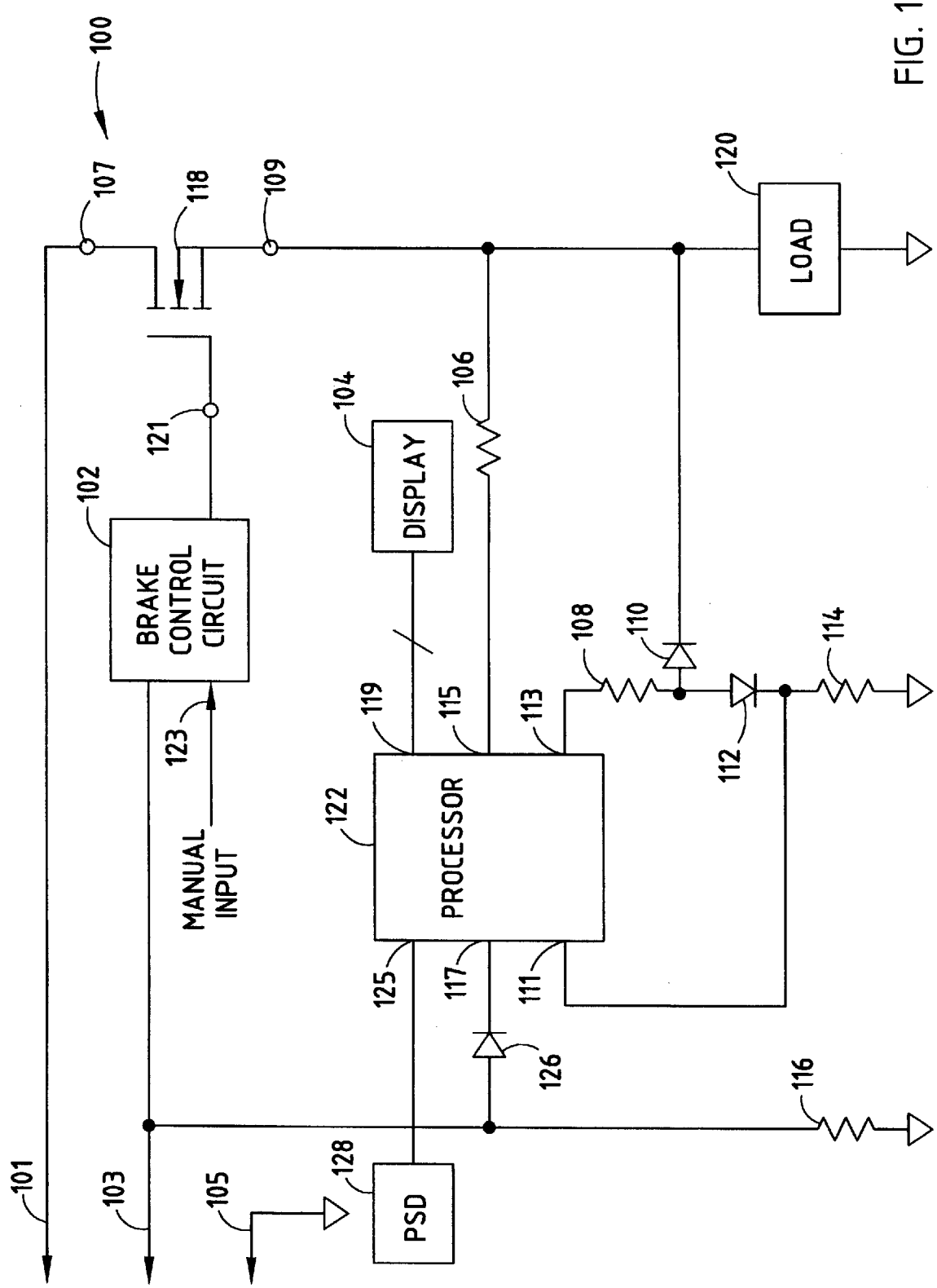
FIG. 1 is a block and schematic diagram of a brake control unit, according to an embodiment of the present invention.

FIG. 1 is a block and electrical schematic diagram of a simplified brake control unit, according to an embodiment of the present invention. Brake control unit 100 includes a terminal 101 that couples to a positive terminal of a vehicle battery, a terminal 103 that couples to a vehicle brake light and a ground terminal 105. Terminals 101, 103 and 105 provide operating power to brake control unit 100 and energizing current to a load 120 (such as an electromagnet of a trailer brake). Brake control unit 100 also includes a brake control circuit 102, a processor 122, a position sensitive device (PSD) 128 and a brake control display 104. Although not shown, processor 122, brake control circuit 102 and display 104 typically derive their operating power from the vehicle battery.

Processor 122 includes a digital input 117 that is coupled to terminal 103 (vehicle brake light) through a diode 126. Processor 122 monitors (at input 117) a voltage drop across a resistor 116 to determine whether the vehicle brake light is asserted. In the preferred embodiment, resistor 116 is a 10 kΩ resistor. It is contemplated that input 117 can be an analog input whose voltage can be measured by an analog-to-digital (A/D) converter internal to processor 122. Processor 122 measures a brake control unit output voltage (at an analog input 115) through isolation resistor 106. Resistor 106 is of a sufficient value (preferably 100 kΩ that input 115 of processor 122 is isolated from a load 120. Processor 122 utilizes an internal A/D converter (not shown) to measure the voltage at input 115. Under the control of processor 122, the voltage read at terminal 115 is displayed on display 104.

Processor 122 can also determine whether brake control unit 100 is connected to a load. Processor 122 accomplishes this by generating a voltage at output 113. A resistor 108 and a resistor 114 are selected such that a voltage drop across resistor 114 allows processor 122 to determine whether load 120 is present (preferably, resistor 108 is a 1 kΩ resistor and resistor 114 is a 10 kΩ resistor). Processor 122 monitors the voltage across resistor 114 through digital input 111. Diode 110 protects input 111 and output 113 from transient voltages. Diode 112 reduces the voltage seen at input 111 by a diode drop (about 0.6 volts). In a typical application, a brake electromagnet has a resistance in the range of 2–3 ohms. When load 120 is present, the voltage at input 111 of processor 122 is at approximately zero volts. When load 120 is not present, the voltage at input 111 of processor 122 will be at a value set by resistors 108 and 114. It is contemplated that input 111 can be an analog input whose voltage can be measured by an internal A/D converter of processor 122. In this manner, processor 122 can determine whether load 120 is connected and thereby provide an indication on display 104. In the preferred embodiment, this occurs when a brake control signal is asserted.

Brake control circuit 102 receives inputs (a brake control signal) from terminal 103 and a manual input 123. If the brake control signal is asserted at terminal 103 or input 123, the brake control circuit 102 will supply a signal on the gate (terminal 121) of a field effect transistor (FET) 118. In the disclosed embodiment, FET 118 is an N-channel FET. FET 118 acts as a switch and provides the positive battery voltage (at terminal 101) to load 120. In a typical brake control unit, a brake control circuit (such as brake control circuit 102) includes a pulse width modulation (PWM) circuit, a voltage doubler circuit, circuitry to receive a manual input and circuitry to set the gain and time constant of an automatic brake control signal received at terminal 103. In response to a brake control signal (at terminal 10 or input 123), brake control circuit 102 provides an appropriate signal at gate 121 of FET 118.

Figure 2A:
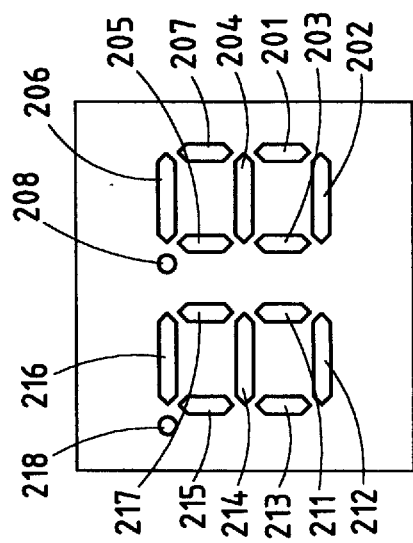
FIGS. 2A–B are views of a brake control display of a brake control unit without power or with power when a brake control signal is not asserted, according to an embodiment of the present invention.
Figure 2B:
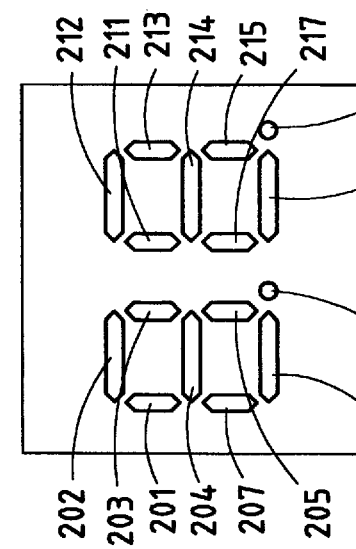

FIG. 2A is front view of a brake control display 104 in a normal mode. FIG. 2B is a front view of brake control display 104 in an inverted mode. FIGS. 2A–B include a dual seven segment display. A first display includes segments 201–207 and a second display includes segments 211–217. Brake control display 104 also includes indicators (LEDs) 208 and 218. As shown in FIGS. 2A–B, when a brake control unit 100 is not powered up or is powered up and a brake control signal is not asserted, none of segments 201–207, segments 211–217 or indicators 208 or 218 are illuminated. In one embodiment, processor 122 determines whether the brake control unit has been installed in a normal mode or an inverted mode at power up.

In that embodiment, processor 122 runs a routine on initial power up to determine whether a brake control signal is asserted. As previously discussed, processor 122 determines this by monitoring the voltage at terminal 117. If a manual brake pedal is depressed, the voltage at terminal 103 will be approximately that of the battery voltage. Likewise, if a manual input is asserted at terminal 123, brake control circuit 102 provides a voltage at terminal 103 that is approximately equal to that of the battery voltage. In this manner, processor 122 can determine whether to invert brake control display 104. Alternatively, a position sensitive device (PSD) 128 can be utilized to enable processor 122 to determine the orientation of brake control unit 100. In this embodiment, an input 125 of processor 122 monitors PSD 128. PSD 128 can, for example, be a mercury switch or a tilt switch or any other type of device that can provide an indication of the orientation of brake control unit 100.

Figure 3A:
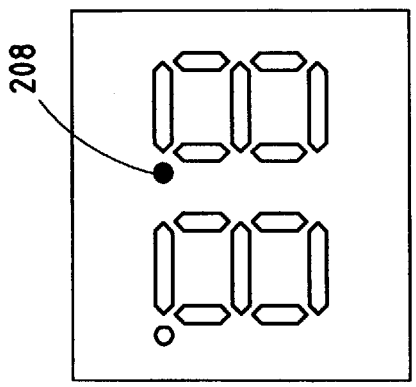
FIGS. 3A–B are front views of a brake control display when a brake control unit is powered up, a brake control signal is asserted and a load is not detected, according to an embodiment of the present invention.
Figure 3B:
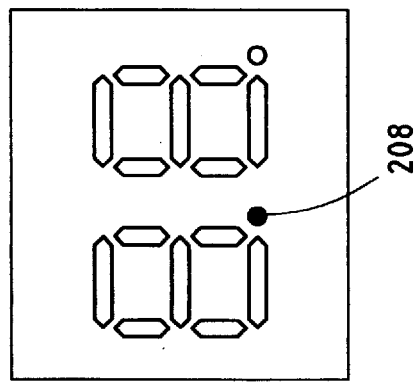

FIG. 3A is a front view of brake control display 104 when brake control unit 100 is powered, a brake control signal is asserted and processor 122 does not detect load 120. In FIG. 3A, the illumination of indicator 208 indicates that load 120 was not detected. Similarly, FIG. 3B is a front view of brake control unit 104 with indicator 208 lit. As in FIG. 3A, when indicator 208 is lit, this indicates brake control unit 100 is powered, a brake control signal is asserted and processor 122 does not detect load 120. As previously discussed, processor 122 determines whether there is a load by asserting a voltage at output 113 (preferably, about every four seconds). If load 120 is present, the voltage is coupled to load 120. If load 120 is not present, resistors 108 and 114 act as a voltage divider with the voltage drop across resistor 114 being coupled to input 111 of processor 122. If load 120 is present, the voltage at input 111 will be approximately equal to zero volts. Resistors 114 and 108 are selected such that processor 122 can distinguish if load 120 is present. That is, the voltages should be sufficiently different such that one causes a comparator internal to processor 122 to detect a '1' and the other a '0'. If the internal A/D converter of processor 122 is utilized, it must be able to distinguish between when load 120 is present and when load 120 is not present.

FIG. 4A is a front view of brake control display 104 when brake control unit 100 is powered up and load 120 is detected. When unit 100 is powered up and load 120 is detected, segments 214, 216 and 217 are lit. Also, indicator 208 is lit. FIG. 4B depicts a brake control display 104 in an inverted mode when brake control unit 100 is powered up and processor 122 detects load 120. In FIG. 4B, segments 202, 203 and 204 are lit to indicate that load 120 is connected. In addition, indicator 208 is lit to indicate brake control unit 100 is powered up.

Figure 6B:
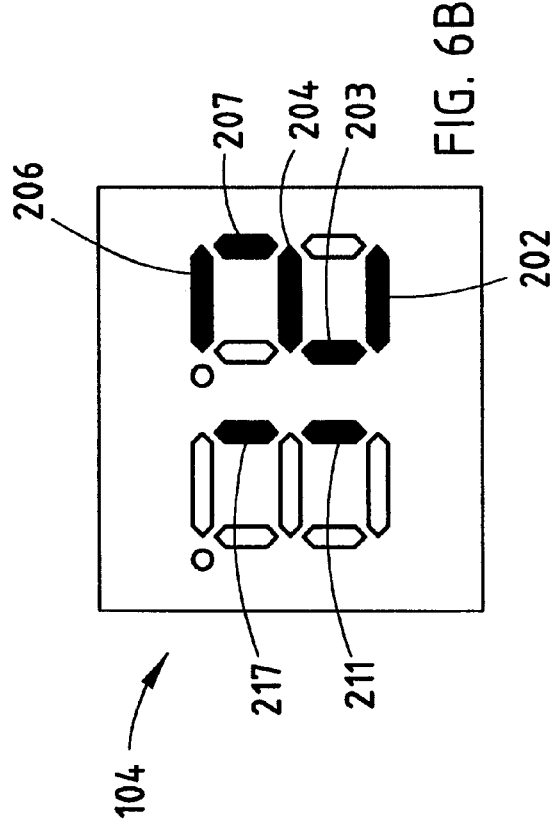
FIGS. 6A–B are front views of a brake control display indicating another output voltage of a brake control unit, according to an embodiment of the present invention.
Figure 6A:
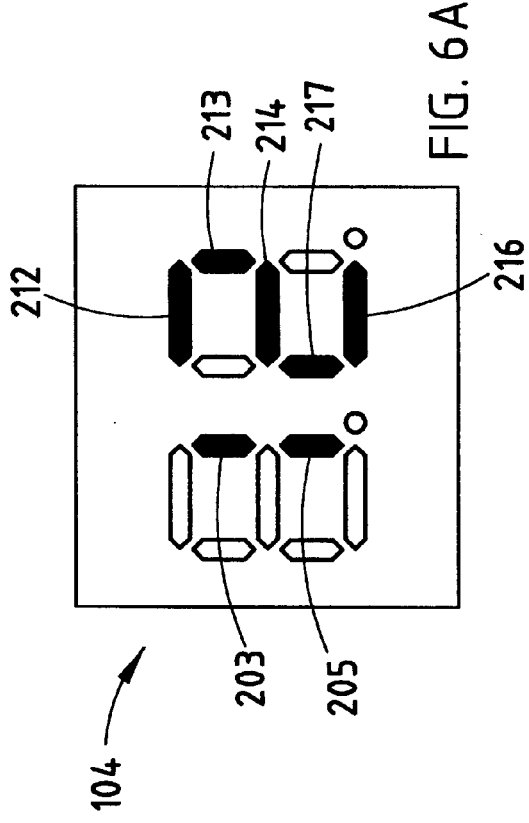

FIGS. 5A–B and FIGS. 6A–B are front views of brake control display 104 indicating a brake control unit 100 output voltage. FIGS. 5A and 6A are front views of brake control display 104 in a normal mode. FIGS. 5B and 6B are front views of brake control display 104 in an inverted mode. In FIGS. 5A–B, indicator 208 acts as a decimal point. FIGS. 5A–B both indicate a brake control unit output voltage of 9.9 volts. In FIG. 5A, all segments except segments 207 and 217 are lit. Additionally, indicator 218 is not lit. In FIG. 5B, all segments and indicators are lit, except segment 203, segment 213 and indicator 218.

As previously discussed, processor 122 reads the voltage at terminal 115 to determine the output voltage of brake control unit 100. This provides the user with an indication of whether brake control unit 100 is functioning properly. FIG. 6A is front view of brake control display 104 with a typical tens and one display. In FIG. 6A, segments 203 and 205 are lit to indicate a one. Segments 212, 213, 214, 216 and 217 are lit to indicate a two. FIG. 6B is a front view of brake control display 104 in an inverted mode. When in the inverted mode, segments 211 and 217 are lit to indicate a one. Segments 202, 203, 204, 206 and 207 indicate a two as shown in FIG. 6B. As previously discussed, processor 122 determines whether brake control unit 100 has been installed in a normal or inverted mode at power up and adjust display 104, if appropriate.

In summary, a brake control unit has been described that provides a properly oriented brake control display irrespective of whether the display is installed in a normal or inverted mode. In one embodiment, a processor in the brake control unit determines whether a brake control signal is asserted at power up. A user can assert a brake control signal by depressing a brake pedal or asserting a manual input. Upon detection of a brake control signal at power up, the processor causes a brake control display to be inverted. In another embodiment, the brake control unit determines orientation by monitoring a position sensitive device. A brake control unit, according to an embodiment of the present invention, can also determine whether a brake load is present and display a status of the brake load. Finally, a brake control unit, according to an embodiment of the present invention, can determine an output voltage of the brake control unit and display a numerical value of the output voltage on the brake control display.

The above description is considered that of the preferred embodiments only. Modification of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. A method for providing a properly oriented brake control display irrespective of whether a brake control unit is installed in a normal or an inverted mode, the method comprising the steps of:

determining whether a brake control signal is asserted when the brake control unit is connected to a vehicle power supply; and providing an inverted display if the brake control signal is asserted, wherein the brake control unit provides a readable display irrespective of whether the display is installed in a normal or an inverted mode.

2. The method of claim 1, wherein the brake control signal is asserted by a manual actuator or a vehicle brake pedal.

3. The method of claim 1, wherein the brake control display includes a plurality of indicators and a plurality of seven segment displays.

4. The method of claim 1, further comprising the steps of:
determining whether the brake control unit is active; and
displaying a status of the brake control unit on the brake control display.

5. The method of claim 1, further comprising the steps of:
determining whether a brake load is present; and
displaying a status of the brake load on the brake control display.

6. The method of claim 5, wherein the determining step further includes the steps of:
providing a test voltage to the brake load;
receiving a divided test voltage, wherein if the divided test voltage is below a load detect level the display indicates that the brake load is present.

7. The method of claim 1, further comprising the step of:
determining an output voltage of the brake control unit; and
numerically displaying the output voltage on the brake control display.

8. A brake control unit, comprising:
a brake control display; and
a processor coupled to the brake control display, the processor executing brake control display code which causes the processor to perform the steps of:
determining whether a brake control signal is asserted when the brake control unit is connected to a vehicle power supply; and
providing an inverted display if the brake control signal is asserted, wherein the brake control unit provides a readable display irrespective of whether the display is installed in a normal or an inverted mode.

9. The brake control unit of claim 8, wherein the brake control signal is asserted by a manual actuator or a vehicle brake pedal.

10. The brake control unit of claim 8, wherein the brake control display includes a plurality of indicators and a plurality of seven segment displays.

11. The brake control unit of claim 8, wherein the brake control display code causes the processor to perform the additional steps of:
determining whether the brake control unit is active; and
displaying a status of the brake control unit on the brake control display.

12. The brake control unit of claim 8, wherein the brake control display code causes the processor to perform the additional steps of:
determining whether a brake load is present; and
displaying a status of the brake load on the brake control display.

13. The brake control unit of claim 12, wherein the determining step further includes the steps of:
providing a test voltage to the brake load;
receiving a divided test voltage, wherein if the divided test voltage is below a load detect level the display indicates that the brake load is present.

14. The brake control unit of claim 8, wherein the brake control display code causes the processor to perform the additional steps of:
determining an output voltage of the brake control unit; and
displaying the output voltage on the brake control display.

15. A method for providing a properly oriented brake control display irrespective of whether a brake control unit is installed in a normal or an inverted mode, the method comprising the steps of:
determining the orientation of the brake control unit; and
providing an inverted display if the brake control unit is installed in an inverted mode, wherein the brake control unit provides a readable display irrespective of whether the display is installed in the normal or inverted mode.

16. The method of claim 15, wherein the orientation of the brake control unit is determined by monitoring a position sensitive device.

17. The method of claim 16, wherein the position sensitive device is a mercury switch.

18. The method of claim 16, wherein the position sensitive device is a tilt switch.

19. A brake control unit, comprising:
a brake control display; and
a processor coupled to the brake control display, the processor executing brake control display code which causes the processor to perform the steps of:
determining the orientation of the brake control unit; and
providing an inverted display if the brake control unit is installed in an inverted mode, wherein the brake control unit provides a readable display irrespective of whether the display is installed in the normal or inverted mode.

20. The brake control unit of claim 19, wherein the processor determines the orientation of the brake control unit by monitoring a position sensitive device.

21. The brake control unit of claim 20, wherein the position sensitive device is a mercury switch.

22. The brake control unit of claim 20, wherein the position sensitive device is a tilt switch.

* * * * *